US006522397B2

(12) United States Patent
Barricau et al.

(10) Patent No.: US 6,522,397 B2
(45) Date of Patent: Feb. 18, 2003

(54) METHOD AND A DEVICE FOR MEASURING SPEED BY THE DOPPLER EFFECT

(75) Inventors: Philippe Barricau, Castelnau d'Estrefonds (FR); André Mignosi, Toulouse (FR); Christine Lempereur, Balma (FR); Jean-Michel Mathe, Fourquevaux (FR)

(73) Assignee: ONERA (Office National d'Etudes et de Recherches Aerospatiales), Chatillon (FR)

(*) Notice: Subject to any disclaimer, the term of this patent is extended or adjusted under 35 U.S.C. 154(b) by 0 days.

(21) Appl. No.: 09/991,707

(22) Filed: Nov. 26, 2001

(65) Prior Publication Data

US 2002/0071110 A1 Jun. 13, 2002

Related U.S. Application Data

(63) Continuation of application No. PCT/FR00/01356, filed on May 17, 2000.

(30) Foreign Application Priority Data

May 27, 1999 (FR) ............................................ 99 06822

(51) Int. Cl.$^7$ ................................................. G01P 3/36
(52) U.S. Cl. ........................................ 356/28.5; 356/28
(58) Field of Search ................................. 356/28.5, 28

(56) References Cited

U.S. PATENT DOCUMENTS 4,919,536 A  4/1990  Komine
4,988,190 A  1/1991  Miles
5,751,410 A  * 5/1998  Roehle et al. ............. 356/28.5

FOREIGN PATENT DOCUMENTS

| EP | 0 506 657 | 10/1992 |
| WO | WO 91/10143 | 7/1991 |
| WO | WO 95/33999 | 12/1995 |

OTHER PUBLICATIONS

International Search Report (in French: Rapport De Recherche Internationale), Aug. 23, 2000.

McKenzie, Robert L., Planar Doppler Velocimetry Performance in Low–Speed Flows, AIAA 97–0498, 35th Aerospace Sciences Meeting and Exhibit, Jan. 6–10, 1997, XP000879333, Reno,NV.

* cited by examiner

Primary Examiner—Stephen C. Buczinski
(74) Attorney, Agent, or Firm—Lawrence E. Laubscher, Sr.

(57) ABSTRACT

A method and device for measuring the speed of at least one object by Doppler effect, whereby the light diffused by an object illuminated by a laser sheet is transmitted to a CCD video camera by spectral filtering means which are substantially tuned to the laser illumination frequency, means being provided to generate reference monochromatic luminous fluxes having frequencies which are different from the laser illumination frequency by fixed known amounts, and the reference luminous fluxes being transmitted to the CCD video camera.

10 Claims, 4 Drawing Sheets

PRIOR ART

METHOD AND A DEVICE FOR MEASURING SPEED BY THE DOPPLER EFFECT

REFERENCE TO RELATED APPLICATION

This application is a continuation of the PCT International Application No. PCT/FR00/01356 filed on May 17, 2000, which is based on the French Application No. 99-06822 filed on May 27, 1999.

BACKGROUND OF THE INVENTION

1. Field of the Invention

The invention relates to a method and a device for measuring speed by the Doppler effect, in particular for measuring a range of speeds in a flow of fluid, but equally for measuring speeds of moving solid bodies such as projectiles or ballistic missiles.

2. Description of the Prior Art

The components of the speed of an object illuminated by a laser sheet can be determined from, on the one hand, the intensity of the light diffused by that object and received directly by appropriate photoreceptors and, on the other hand, the intensity of the same light received by other appropriate photoreceptors via spectral filter means tuned to the frequency of the illuminating laser sheet. This is already known in the art (see in particular the documents EP-0506657 and AIAA 97-0498, 35th Aerospace Sciences Meeting and Exhibit, Reno, Nev., Jan. 6–10, 1997, "Planar Doppler Velocimetry performance in low-speed flows" by R. L. McKenzie). The illuminating laser sheet is typically emitted by an argon or Nd-YAG pulsed laser associated with a frequency doubler, the spectral filter means include a cell containing iodine vapor, which has an absorption line in the vicinity of the illuminating laser frequency and whose transmission is approximately 50% at that frequency, and the photoreceptors are of the CCD matrix type.

The function of the spectral filter means is to convert variations in the frequency of the light diffused by the object caused by the Doppler effect into variations in the intensity of the light picked up by the photoreceptors. Thus the intensity of the light picked up via the spectral filter means varies as a function of the speed of movement of the object. The ratio of the intensity picked up via the spectral filter means and the intensity picked up directly is calculated to obtain a normalized signal that varies as a function of the Doppler shift and a knowledge of which can be used to calculate the speed of the object in a direction in space.

Also, a portion of the laser beam is sampled and directed onto photoreceptors of the CCD matrix, on the one hand directly and on the other hand via the spectral filter means, to obtain a normalized signal (the previously cited ratio of the luminous intensities received directly and via the spectral filter means) that corresponds to a zero speed and is used for continuous compensation of variations in time of the laser frequency.

Accordingly, subject to prior calibration of the spectral transmission function of the filter means previously cited, the frequency difference due to the Doppler effect is determined from the normalized signal derived from the light diffused by a moving object and the zero speed normalized signal, and the speed of that object in the direction in space defined by the direction of the laser illumination and by the observation direction is then calculated. By effecting the observations in three different directions, three components of the speed vectors of objects moving in the observation field are obtained.

However, this prior art technique does not take into account the conversion drift of the spectral filter means, in particular as a function of temperature, in real time as a result of which the accuracy of the speed measurement proves insufficient.

SUMMARY OF THE INVENTION

One object of the invention is to solve this problem by simple, efficient and economic means.

To this end the invention proposes a method of measuring the speed of at least one object by the Doppler effect, including:

illuminating the object with a laser sheet derived from a laser beam, measuring the intensity of the light diffused by the object, on the one hand directly and on the other hand via spectral filter means substantially tuned to the frequency of the laser illumination, obtaining a normalized signal equal to the ratio of the intensity measured via the spectral filter means and the intensity directly measured, measuring the intensity of a portion of the laser beam, on the one hand via the spectral filter means and on the other hand directly, and determining the ratio of the measured intensities to obtain a normalized signal corresponding to a zero speed, and determining from said normalized signals a component of the speed of the object in a particular direction, characterized in that it further includes:

measuring the intensity of at least one reference monochromatic luminous flux, on the one hand directly and on the other hand via the spectral filter means, said reference flux having a frequency differing from that of the laser beam by a known fixed amount, and determining the ratio of the measured intensities of the reference flux to obtain a normalized reference signal corresponding to a fixed and known frequency difference and thus to a known speed different from zero.

This normalized reference signal, which corresponds to a known fixed frequency difference, is used to recalibrate in real time the transmission curve of the spectral filter means, compensating any drift thereof.

The frequency difference is advantageously chosen to cover a substantially linear portion of the transmission curve, starting from the point corresponding to a zero speed. It then becomes possible to determine accurately, by interpolation, the value of the Doppler shift that corresponds to a normalized signal derived from the light diffused by the object when that signal is between the normalized signal for the zero speed and the normalized signal for the reference flux.

This method advantageously includes measuring the intensities, on the one hand directly and on the other hand via the spectral filter means, of a plurality of reference monochromatic luminous fluxes whose frequencies differ from that of the laser beam by fixed and known amounts different from one to another and determining, for each reference flux, the ratio between said measured intensities to obtain normalized reference signals corresponding to different fixed and known frequency differences.

These frequency differences are advantageously staggered over a larger portion of the transmission curve of the spectral filter means, in particular over non-linear areas of that curve. For example, one effect of this is to double the frequency dynamic range, which results in a corresponding increase in the dynamic range of the measurable speeds.

In accordance with another feature of the above method, the or each reference flux is emitted in an intermediate image plane of optical means for forming an image of the object on a set of photodetectors. This avoids disturbing the field of speeds to be measured.

Advantageously, the or each reference flux is emitted by a substantially point source.

Thus only a very small portion of the image of this field is used to acquire the reference flux intensities.

The invention also proposes a device for measuring a speed of at least one object by the Doppler effect, including:

means for illuminating the object with a laser sheet derived from a laser beam, optical means for forming an image of the object on two sets of photoreceptors whose output signals correspond to the received luminous intensity, spectral filter means substantially tuned to the frequency of the laser beam and disposed between said optical means and one set of said two sets of photoreceptors, means for directly and simultaneously directing a portion of the laser beam onto a first portion of each of said two sets of photoreceptors via the image forming optical means, to obtain normalized signals of the light diffused by the object and normalized signals corresponding to a zero speed, characterized in that it further includes:

means for generating at least one reference monochromatic luminous flux having a frequency different from that of the laser beam by a known fixed amount, and means for directly and simultaneously directing said reference flux onto a second portion of each of said two sets of photoreceptors via the image forming optical means, to obtain a normalized reference signal corresponding to a fixed and known frequency difference.

The device according to the invention advantageously includes means for generating a plurality of reference monochromatic luminous fluxes whose frequencies differ from that of the laser beam by fixed and known amounts different from one to another and means for directing said reference fluxes onto separate portions of each of said two sets of photodetectors through the optical image forming means, to obtain normalized reference signals corresponding to fixed and known frequency differences.

In one preferred embodiment of the invention, the means for generating the reference flux or fluxes are acoustical-optical means such as a Bragg device.

These means generate reference fluxes whose frequencies are different from the frequency of the laser illumination by values equal at $\pm n\Delta F$, $\Delta F$ being a fixed and known frequency difference, and n being an integer greater than zero.

The frequency differences are advantageously staggered regularly over the usable portion of the spectral transmission curve of the filter means previously cited.

According to other features of the invention:

the means for generating the references fluxes are connected by optical fibers to the image forming means, the optical fibers have ends substantially in an intermediate image plane of the image forming means and oriented toward said photodetectors.

Generally speaking, the invention improves the accuracy of the measurement of the speed of an object by the Doppler effect and can be applied in fluid mechanics to measuring a range of speeds and in ballistics to measuring the speeds of moving objects, for example projectiles.

BRIEF DESCRIPTION OF THE DRAWINGS

The invention will be more clearly understood and other features, details and advantages of the invention will become more clearly apparent on reading the following description, which is given by way of example and with reference to the accompanying drawings in which.

DESCRIPTION OF THE PREFERRED EMBODIMENTS

Figure 1:
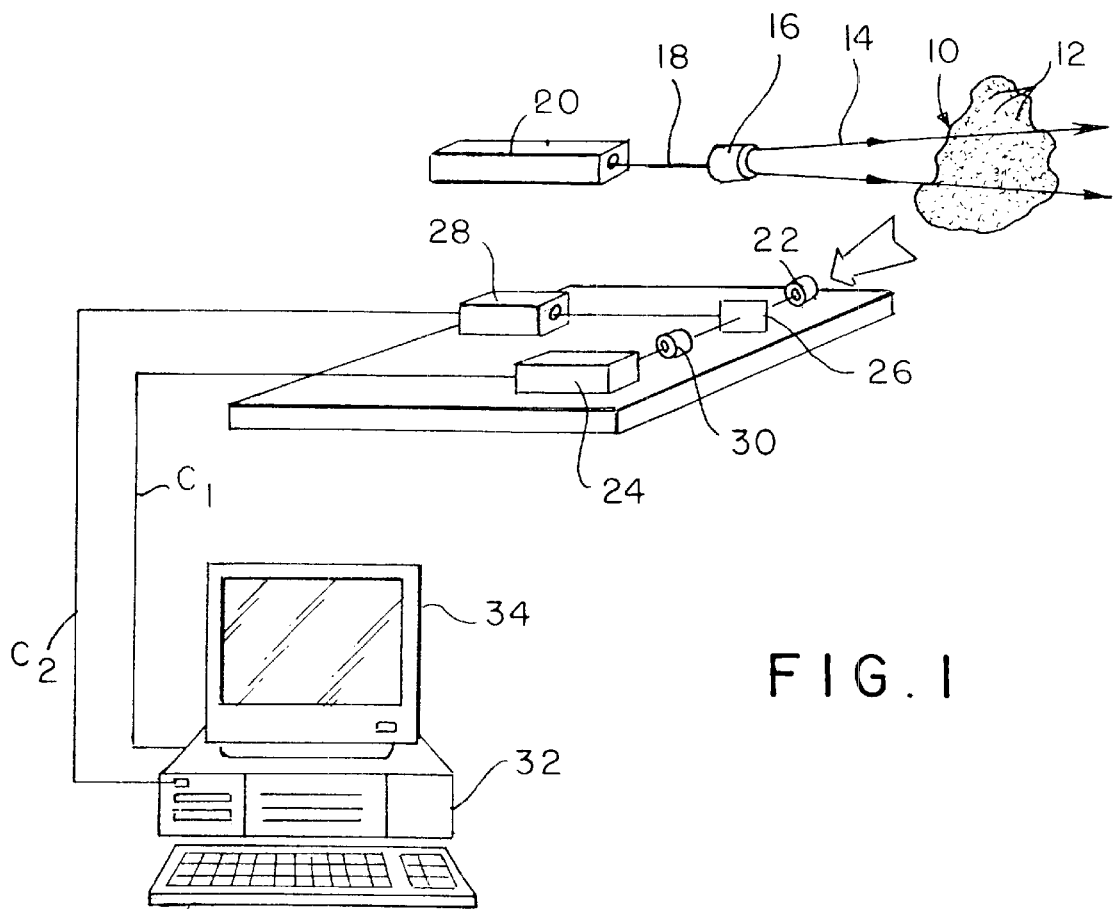
FIG. 1 is a diagrammatic perspective view of a prior art device.
Figure 2:
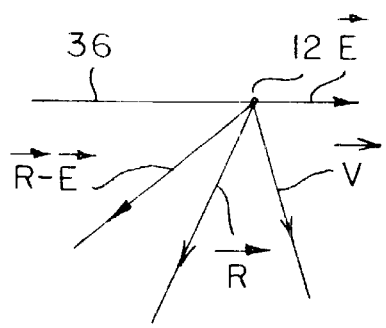
FIG. 2 is a diagram representing the direction of the speed component determined as a function of the illumination direction and the observation direction.

The embodiment shown in FIGS. 1 and 2 is applied to determining a range of speeds in a fluid flow 10 by measuring Doppler shifts of light diffused by particles 12 injected into the fluid flow. For example, and as described in the prior art documents previously cited, a flow of gas can be seeded with a mist of very fine particles of an appropriate liquid or solid which are dispersed in the flow of gas and entrained thereby.

The flow 10 is illuminated by a laser sheet 14 generated by appropriate means 16, such as beam spreading optics (a set of cylindrical and spherical lenses) or a rotating polygon device, from the beam 18 emitted by an appropriate laser, such as a longitudinal monomode argon laser emitting a wavelength of 514.5 nm or a frequency-doubled 532 nm YAG laser.

The laser light is diffused by the particles 12 present in the flow 10. Means for detecting the light diffused by the particles 12 include an optical system 22 for forming an image on a set of photodetectors such as a CCD video camera 24, for example, the luminous flux transmitted by the optical system 22 passing through a beam splitter 26 that directs a portion of that flux toward another set of photodetectors, such as another CCD video camera 28, for example, the luminous flux transmitted by the beam splitter 26 passing through spectral filter means 30 tuned to the frequency of the laser beam 18 before reaching the CCD video camera 24.

For example, the filter means 30 consist of a cell containing iodine vapor, which has an absorption line in the vicinity of the frequency of the laser beam 18, the transmission being approximately 50% at that frequency, for example.

The CCD video cameras 24 and 28 have their output connected by conductors $C_1$ and $C_2$, respectively, to data processing means 32 including data acquisition and computation means and display means 34 on which images of the observed field can be displayed, in which images the components of the speeds of the particles in a given direction are represented by different shades of grey or different colors.

In FIG. 2, $\vec{V}$ is the speed vector of a particle 12 illuminated by an incident laser ray 36 whose propagation direction is represented by the unit vector $\vec{E}$ and $\vec{R}$ is the unit radius of the observation direction (the direction connecting the particle 12 to the vanishing point of the image).

The Doppler shift of the light diffused by the particle 12 relative to the laser illumination is given by the equation:

$$\Delta f = \frac{Fo}{c} \vec{V} \cdot (\vec{R} - \vec{E})$$

in which Of is the frequency of the laser illumination and c is the speed of light in a vacuum.

In FIG. 2, the vector $\vec{R} - \vec{E}$ represents the direction in which the component of the speed V of the particle is measured by the device shown in FIG. 1.

Figure 3:
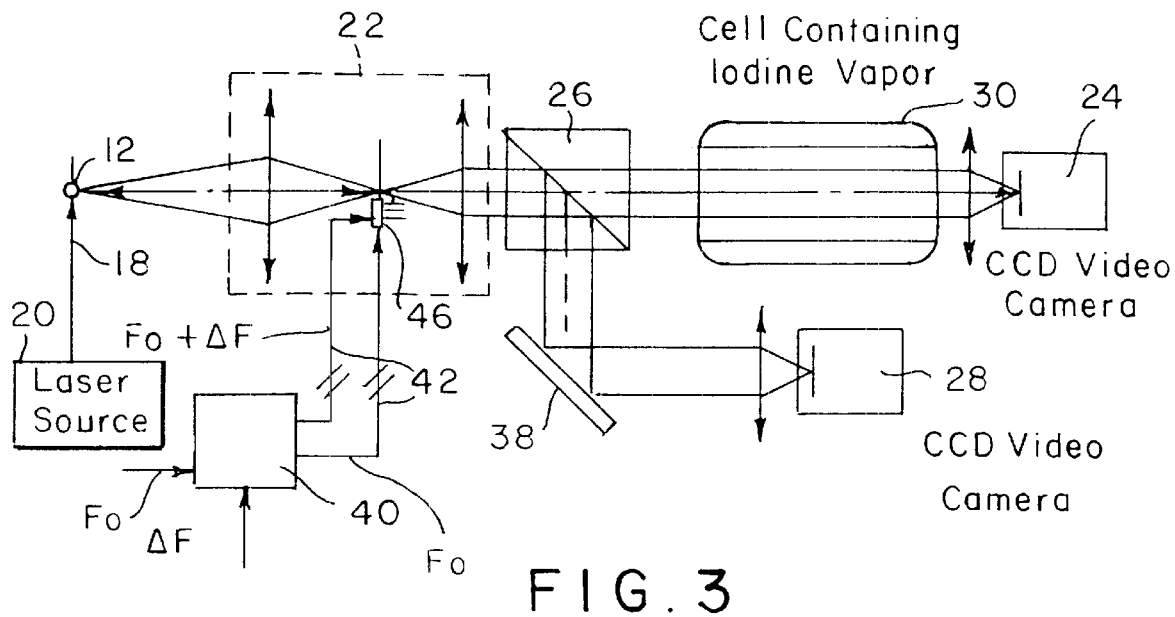
FIG. 3 is a diagrammatic top view showing the essential components of the device according to the invention.

The light diffused by the particles 12 is picked up by the optical system 22 and some of it is transmitted to the first CCD video camera 24 after passing through spectral filter means 30 and some of it is transmitted to the other CCD video camera 28, possibly by means of a reflecting mirror 38 (FIG. 3). The output signals from the video cameras 24 and 28 provide pixel by pixel comparison of the intensity of the diffused light received directly by the video camera 28 and that of the diffused light received by the video camera 24 after passing through the spectral filter means 30.

Figure 4:
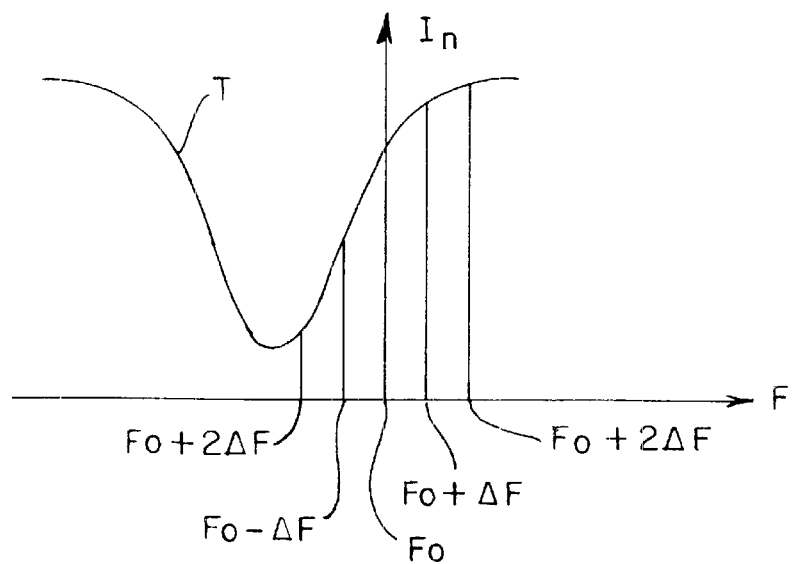
FIG. 4 is a graph representing a portion of the spectral transmission curve of filter means used in the device according to the invention.

As can be seen on the spectral transmission curve T in FIG. 4, the spectral filter means 30 are tuned to a frequency close to the frequency Fo of the laser beam 18, the transmission being approximately 50% at the frequency Fo. As a function of the direction of movement of the particles 12 relative to the measuring device, the frequency of the light diffused by the particles may be greater than or less than the frequency Fo and its transmission by the means 30 will be respectively greater than or less than what it would be for the frequency Fo.

For the fluctuations in the frequency Fo of the laser beam 18 and drift, in particular thermal drift, of the filter means 30 to be taken into account and compensated automatically, the invention provides means 40 (FIG. 3) for generating monochromatic reference fluxes that are injected into the luminous flux transmitted by the optical system 22 and picked up by the photodetectors of the CCD video cameras 24 and 28.

The means 40 are advantageously acoustical-optical means and include a crystal in which a phase array is induced by the propagation of an acoustic wave generated by a piezo-electric crystal across which a sinusoidal voltage of frequency ΔF is applied. When a light wave of frequency Fo (a portion of the laser beam 18) propagates in the crystal, a beam at the frequency Fo and a beam at the frequency Fo+ΔF (Bragg-type operation) are obtained at the output. These two frequencies can be transmitted by optical fibers 42 at two points of an intermediate image plane of the optical system 22, the ends of the optical fibers 42 being oriented in that plane in the direction of the splitter cube 26. Thus the output signals from the video cameras 24 and 28 supply measurements of the intensities of the luminous fluxes at the frequencies Fo and Fo+ΔF picked up by the video camera 24 after passing through the filter means 30 and picked up directly by the video camera 28.

This provides two points on the spectral transmission curve (FIG. 4) corresponding to the frequencies Fo and Fo+ΔF, regardless of the fluctuations in the frequency Fo of the laser beam 18, the value ΔF being fixed and known.

Figure 5:
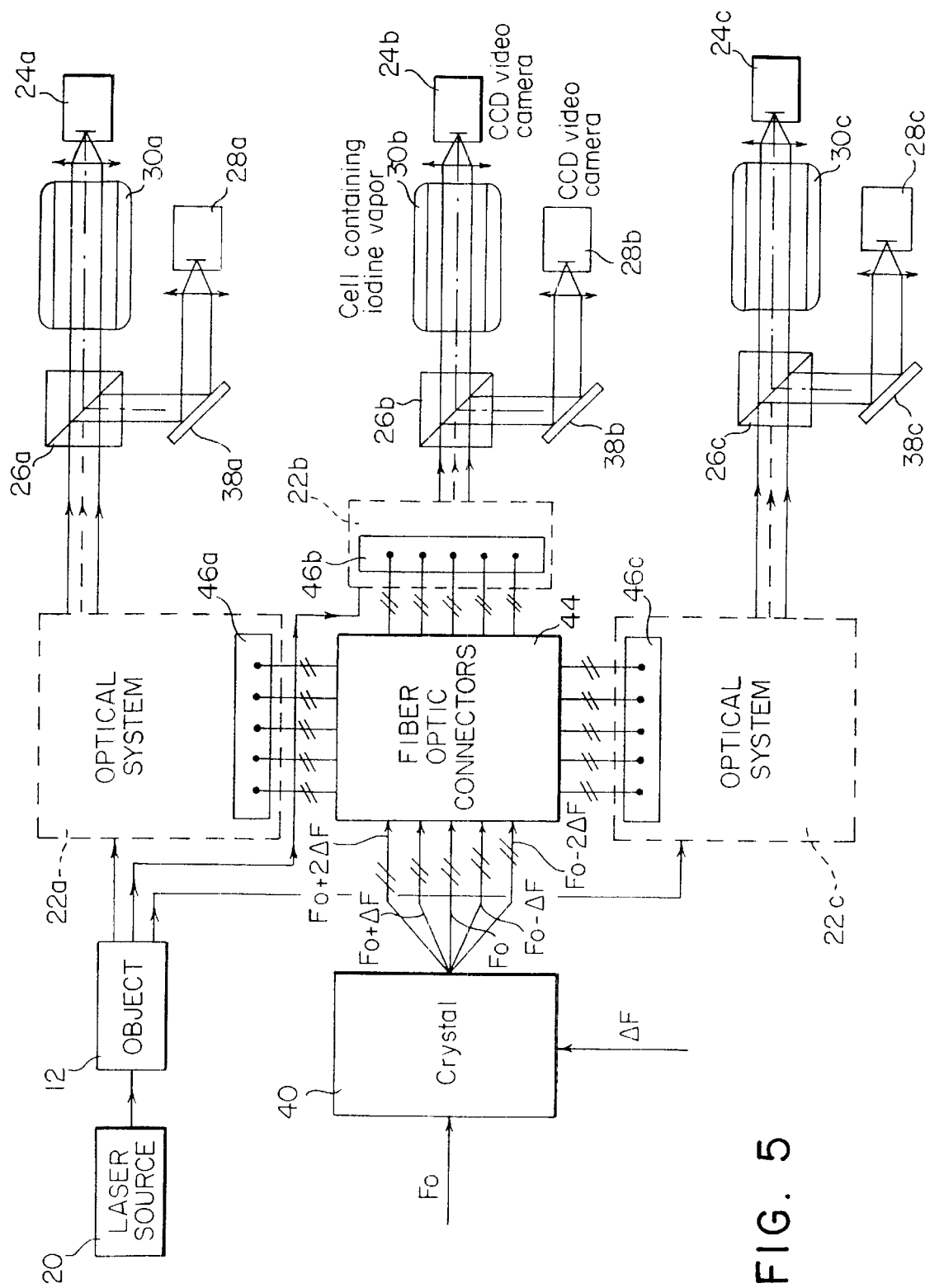
FIG. 5 is a diagrammatic representation of means for generating reference fluxes used in a device according to the invention.
Figure 6:
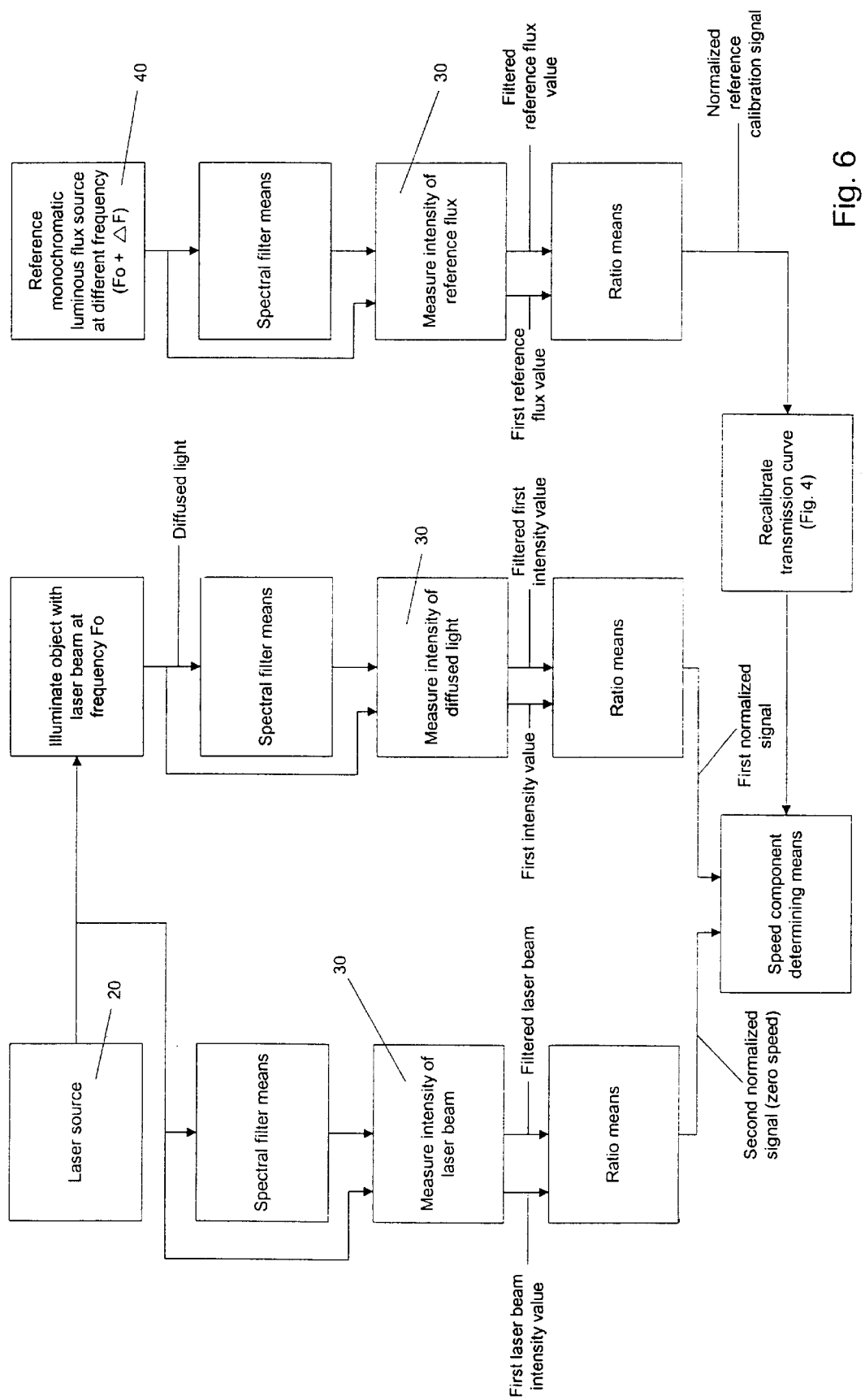
FIG. 6 is a flow diagram illustrating the method of the present invention.

The measured intensities supplied by the CCD video camera 28 are used to obtain normalized signals $I_n$ (FIG. 4) which are equal to the ratios (pixel by pixel) of the intensities measured by the video camera 24 and the intensities measured by the video camera 28. As shown diagrammatically in FIG. 5, the reference luminous flux generator means 40 preferably operate in the RAMAN-NATH mode to supply at the output light beams having the frequencies Fo, Fo+ΔF, Fo−ΔF, Fo+2ΔF and Fo−2ΔF. As shown in FIG. 6, the normalized reference signals are used to recalibrate in real time the transmission curve (FIG. 4) of the spectral filter means, thereby to compensate for any drift thereof.

Those beams are transmitted by optical fibers 42 and by a set of connectors 44 to three small modules 46a, 46b, and 46c, each associated with an optical system 22a, 22b, and 22c and a detector device such as that shown in FIG. 3 for measuring components of the speeds of the particles 12 in three different directions, in which case only one fixed direction laser source 20 is used.

In each module 46a, 46b, and 46c, the ends of the optical fibers 42 are oriented toward the splitter cubes 26a, 26b, and 26c, and transmit five reference luminous fluxes having the frequencies indicated above. In this manner, the reference fluxes may be directed onto separate portions of each of the two sets of photodectors (24a, 28a; 24b, 28b; 24c, 28c), respectively.

This enables use of a larger portion of the spectral transmission curve of the means 30, including non-linear portions, which automatically and permanently compensates for fluctuations in the illumination laser frequency and drift in time of the spectral filter means 30 (FIG. 6).

The frequency difference ΔF previously cited can be 200 MHz, providing a working frequency range of 1 GHz around the laser frequency Fo. The measured speed dynamic range depends on the geometrical aiming conditions. In the case of a standard configuration encountered in a wind tunnel, a speed dynamic range is obtained which is increased from 350 m/s (if limited to the linear portion of the spectral transmission curve of the means 30) to 700 m/s, for example, in other words which is doubled.

The spectral filter means 30 typically consist of an iodine vapor cell. If the temperature variation of the finger of the cell is 0.5° C., the resulting frequency variation is approximately 5 MHz. Frequency variations of the laser source 20 can be of the order of 2 MHz. They generate a measured speed uncertainty of approximately 5 m/s (in the standard configuration). With the invention this uncertainty tends toward zero, with automatic compensation of thermal drift of the iodine vapor cell and frequency fluctuations of the laser source.

The acoustic/optical means 40 can generate frequency differences with a relative accuracy of the order of $10^{-6}$, i.e. with an uncertainty of 200 Hz for a frequency difference ΔF of 200 MHz. The measuring error is therefore related to the uncertainty of the interpolation technique used to obtain in real time the calibration curve of the spectral transmission function of the iodine vapor cell and the uncertainty related to the radiometric measurement of the video cameras 24 and 28, which is estimated at 0.15% in the case of video cameras with ten real bits.

What we claim is:

1. The method of measuring the speed of at least one object by the Doppler effect, comprising:
   (a) illuminating the object with a laser sheet (14) derived from a laser beam (18) from a source (20) having a given frequency (Fo);
   (b) measuring the intensity of the light diffused by the object to obtain a first intensity value;
   (c) measuring the intensity diffused by the object via spectral filter means (30) substantially tuned to the frequency of the laser illumination, thereby to obtain a filtered first intensity value;

(d) obtaining a first normalized signal equal to the ratio of the filtered first intensity value of the first intensity value;

(e) measuring the intensity of a portion of the laser beam directly to obtain a first laser beam intensity value;

(f) measuring the intensity of said laser beam portion via said spectral filter means to obtain a filtered laser beam intensity value;

(g) determining the ratio of the filtered and first laser beam intensity values to obtain a second normalized signal corresponding to a zero speed;

(h) determining from said first and second normalized signals a component of the speed of the object in a particular direction;

(i) measuring the intensity of at least one reference monochromatic luminous flux having a frequency differing from that of the laser beam by a known amount, thereby to obtain a first reference flux value:

(j) measuring the reference monochromatic luminous flux via the spectral filter means, thereby to obtain a filtered reference flux value;

(k) determining the ratio of the measured intensities of the filtered and first reference flux values to obtain a normalized reference signal corresponding to a fixed and known frequency difference; and (l) utilizing said normalized reference signal to compensate for the thermal drift of said spectral filter means and the frequency variations of said laser beam.

2. The method claimed in claim 1, and further including measuring the intensities, directly and via the spectral filter means, of a plurality of reference monochromatic luminous fluxes whose frequencies differ from that of the laser beam by fixed and known amounts different from one to another, and determining, for each reference flux, the ratio between said measured intensities to obtain a plurality of normalized reference signals corresponding to different fixed and known frequency differences.

3. The method claimed in claim 1, characterized in that each reference flux is derived from the laser beam by shifting the frequency of said beam.

4. The method claimed in claim 1, characterized in that each reference flux is emitted in an intermediate image plane of optical means for forming an image of the object on each set of photodetectors.

5. The method claimed in claim 1, characterized in that each reference flux is emitted by a point source.

6. Apparatus for measuring the speed of an object by the Doppler effect, comprising:

(a) means for illuminating the object with a laser sheet derived from a laser beam (18) having a given frequency (Fo);

(b) optical means (22) for forming an image of the object on first portions of two photoreceptor means (24, 28) whose output signals correspond to the received luminous intensity:

(c) spectral filter means (30) tuned generally to said laser beam frequency and disposed between said optical means and a first one of said photoreceptor means;

(d) means (26) for simultaneously directing a portion of said laser beam directly onto a first portion of each of said photoreceptor means via said image forming optical means;

(e) means (32) for determining the ratio of the measured intensities of the light diffused by the object and the ratio of the measured intensities of said portion of the laser illumination, thereby to obtain normalized signals (In);

(f) means (40) for generating at least one reference monochromatic luminous flux having a frequency different from laser beam frequency by a known fixed amount; and (g) means (42) for introducing said reference flux into said image forming optical means and directing it directly onto a second portion of one of said photodetector means, and via said spectral filter means onto a second portion of the other photodetector means, thereby to obtain a normalized reference signal corresponding to a fixed and known frequency difference, and to compensate for thermal drift of said spectral filter means and for variations in the frequency of the laser beam.

7. Apparatus as defined in claim 6, wherein said monochromatic luminous flux generating means is operable to generate a plurality of reference monochromatic luminous fluxes whose frequencies differ from that of the laser beam by fixed and known amounts different from one to another, and means for directing said reference fluxes onto separate portions of each of said two sets of photodetectors.

8. Apparatus as defined in claim 6, wherein said means for generating the reference flux include Bragg acoustical-optical means.

9. Apparatus as defined in claim 7, wherein said means for generating said reference fluxes is operable to generate reference fluxes whose respective frequencies are $Fo+n\Delta F$ and $Fo-n\Delta F$, Fo being the frequency of the laser illumination, $\Delta F$ being a fixed and known frequency difference, and n being an integer greater than zero and taking the values 1, 2, etc.

10. Apparatus as defined in claim 6, wherein said means for generating the references fluxes are connected by optical fibers to the image forming means, each optical fiber having one end substantially in an intermediate image plane of the image forming means and oriented toward said photodetectors.

* * * * *